(12) United States Patent
Someno

(10) Patent No.: US 7,308,694 B2
(45) Date of Patent: Dec. 11, 2007

(54) HIGH-PRECISION POSITIONING APPARATUS

(75) Inventor: Yoshihiro Someno, Miayagi-ken (JP)

(73) Assignee: ALPS Electric Co., Ltd., Ota-Ku, Tokyo (JP)

( * ) Notice: Subject to any disclaimer, the term of this patent is extended or adjusted under 35 U.S.C. 154(b) by 630 days.

(21) Appl. No.: 10/864,176

(22) Filed: Jun. 8, 2004

(65) Prior Publication Data

US 2004/0268375 A1 Dec. 30, 2004

(30) Foreign Application Priority Data

Jun. 25, 2003 (JP) ............................. 2003-180848

(51) Int. Cl.
*G11B 17/02* (2006.01)
*G11B 7/0065* (2006.01)

(52) U.S. Cl. .................. 720/696; 720/695; 720/697; 720/700; 720/703; 720/704; 720/713; 720/714

(58) Field of Classification Search ............... 720/695, 720/696, 697, 700, 703, 704, 713, 714
See application file for complete search history.

(56) References Cited

U.S. PATENT DOCUMENTS

| | | | | |
|---|---|---|---|---|
| 5,461,605 A | * | 10/1995 | Takimoto et al. ........... 369/126 |
| 5,500,843 A | * | 3/1996 | Ishii et al. ................... 720/703 |
| 5,519,553 A | | 5/1996 | Hashimoto et al. |
| 5,615,143 A | * | 3/1997 | MacDonald et al. ........ 365/112 |
| 5,671,210 A | * | 9/1997 | Goto ........................... 720/711 |
| 6,137,762 A | * | 10/2000 | Uwabo et al. ............... 720/635 |
| 6,486,982 B1 | | 11/2002 | Davis ............................. 359/9 |
| 2001/0033446 A1 | | 10/2001 | King et al. |
| 2002/0005432 A1 | | 1/2002 | King et al. |
| 2003/0107983 A1 | * | 6/2003 | Kim et al. ................... 369/270 |

FOREIGN PATENT DOCUMENTS

| | | |
|---|---|---|
| EP | 1150284 A2 | 10/2001 |
| JP | 2001-093157 | 6/2001 |

* cited by examiner

*Primary Examiner*—Andrea Wellington
*Assistant Examiner*—Carlos E Garcia
(74) *Attorney, Agent, or Firm*—Beyer Weaver LLP

(57) ABSTRACT

A high-precision positioning apparatus includes a fine driving unit for producing horizontal and small movements of a flat recording medium relative to an optical system, the medium being used for optically recording and reproducing information. The fine driving unit includes a frame-shaped unit body, a first driving frame inside the unit body, and a second driving frame inside the first driving frame and secured at a position adjacent to a magnetized portion of the recording medium. The first driving frame is movable relative to the unit body by fine driving devices in the horizontal direction of the recording medium, while the second driving frame is movable relative to the first driving frame by other fine driving devices in the horizontal direction of the recording medium and in the direction substantially orthogonal to the moving direction of the first driving frame, thereby producing horizontal and small movements of the recording medium.

5 Claims, 3 Drawing Sheets

HIGH-PRECISION POSITIONING APPARATUS

BACKGROUND OF THE INVENTION

1. Field of the Invention

The present invention relates to high-precision positioning apparatuses, in holographic memories, for precise positioning of recording media relative to optical systems. In particular, the present invention relates to a high-precision positioning apparatus for precise positioning of a roughly positioned recording-medium by producing small movements of the recording medium.

2. Description of the Related Art

Memories widely used in, for example, computers, magnetically or optically write and read two-dimensional data to and from recording media. Examples of known magnetic memories include hard disks, while examples of known optical memories include CDs and DVDs. The quality of these memories has been significantly improved in terms of recording density so as to meet the demand for larger capacity. In addition, memories based on the hologram principle (hereinafter referred to as "holographic memories") have been developed to further increase capacity.

In a holographic memory, an encoded object beam and reference beam create interference on a recording medium to form a hologram, thereby allowing information to be stored. The object beam is applied to the-recording medium in the form of two-dimensional digital data, while the reference beam is applied to the recording medium to play back the stored information in the form of two-dimensional digital data. The recording medium and an optical system including the object beam and the reference beam thus require precise positioning. This positioning is achieved by horizontal movements of the flat recording medium while the optical system is kept fixed. An example of such a holographic memory is disclosed in Japanese Unexamined Patent Application Publication No. 2001-93157.

Card-type or disc-type recording media are used in known holographic memories. In the case of a card-type recording medium, sliders are provided in an X-direction and Y-direction so as to move the medium, relative to the optical system, in the X-direction and Y-direction orthogonal to each other. In the case of a disc-type recording medium, a motor is connected to the center of the medium to rotate the medium, while a slider for traversing the motor is provided to radially move the medium.

However, a known positioning apparatus for a recording medium in a holographic memory has the following problem.

To randomly access information, large movements of a recording medium, on a page-by-page basis of a hologram, are required. On the other hand, for precise positioning of the recording medium relative to an optical system, small movements of the medium are required. For providing such small movements, stepping of a motor or a slider for driving the recording medium needs to be minimized. However, large movements-using such a driving unit place a heavy load thereon. Therefore, providing both large and small movements of the recording medium by the same driving unit is difficult and raises costs associated with the positioning apparatus for recording media.

SUMMARY OF THE INVENTION

Accordingly, an object of the present invention is to solve the above-described problem and provide a high-precision positioning apparatus that can perform small movements of a recording medium, relative to an optical system, for achieving precise positioning at a relatively low cost.

To solve the problem described above, a high-precision positioning apparatus of the present invention includes a coarse driving unit for producing horizontal movements of a flat recording medium relative to an optical system, the recording medium being used for optically recording and playing back information; and a fine driving unit for producing horizontal and small movements of the recording medium relative to the optical system.

The coarse driving unit has a driving shaft connected to the recording medium for driving thereof, and a raising/lowering device for producing movements of the fine driving unit along the driving shaft. The fine driving unit includes a frame-shaped unit body, a first driving frame inside the unit body, and a second driving frame inside the first driving frame.

The first driving frame is movable relative to the unit body by fine driving devices in the horizontal direction of the recording medium. The second driving frame is movable relative to the first driving frame by fine driving devices in the horizontal direction of the recording medium and in the direction substantially orthogonal to the moving direction of the first driving frame.

The fine driving unit secures the second driving frame to the recording medium while being moved along the axis of the driving shaft by the raising/lowering device to isolate the recording medium from the driving shaft, and allows the first driving frame and the second driving frame to move relative to each other for producing horizontal and small movements of the recording medium.

As described above, the recording medium is horizontally moved by the coarse driving unit, and then isolated from the coarse driving unit and secured to the fine driving unit, which is driven by the fine driving devices, for small movements. Thus, page-by-page movements of the recording medium and precise positioning of the recording medium are independently performed by their respective driving mechanisms. Since it is not necessary for one mechanism to produce both movements, the high-precision positioning apparatus with high accuracy can be provided at a low cost.

Moreover, in the high-precision positioning apparatus of the present invention, the driving shaft has a fixing plate parallel to the recording medium and is connected to the recording medium by the fixing plate. The fine driving unit has a lifting plate on the second driving frame, the lifting plate having a thickness larger than that of the fixing plate. The fine driving unit moves along the driving shaft for allowing the lifting plate to come into contact with and to be secured to the recording medium, while isolating the recording medium from the fixing plate for producing small movements of the recording medium. Thus, connection of the recording medium is easily switched from the coarse driving unit to the fine driving unit.

Furthermore, in the high-precision positioning apparatus of the present invention, the recording medium includes a magnetized portion in contact with the driving shaft. The magnetized portion is secured to the fixing plate and the lifting plate by magnetic force. Thus, the recording medium is easily secured to and isolated from the fixing plate and the lifting plate.

In the high-precision positioning apparatus of the present invention, the first driving frame is linearly and rotationally movable relative to the unit body by two fine driving devices, while the second driving frame is linearly and rotationally movable relative to the first driving frame by two fine driving devices. Linear and rotational movements of the first driving frame and the second driving frame can thus be accomplished by a simple structure.

Moreover, in the high-precision positioning apparatus of the present invention, the first driving frame is connected to the unit body with elastic bodies, while the second driving frame is connected to the first driving frame with elastic bodies. A triple structure is thus formed and the movements of the first driving frame and the second driving frame are stabilized.

DESCRIPTION OF THE PREFERRED EMBODIMENTS

Figure 1:
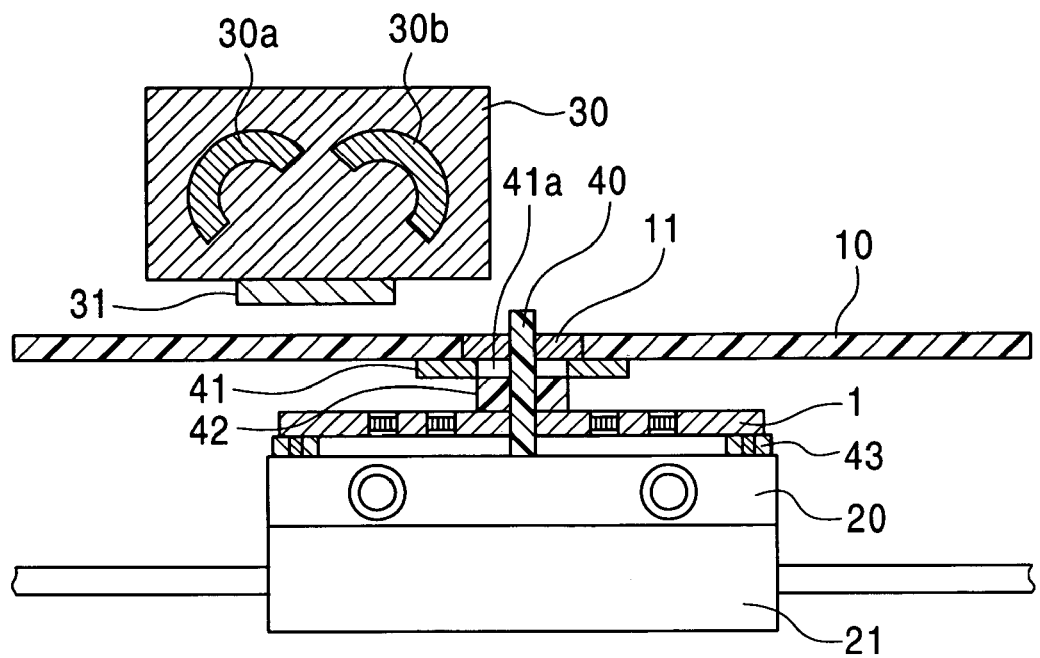
FIG. 1 is a cross-sectional view showing a pre-operation state of the high-precision positioning apparatus according to an embodiment.
Figure 2:
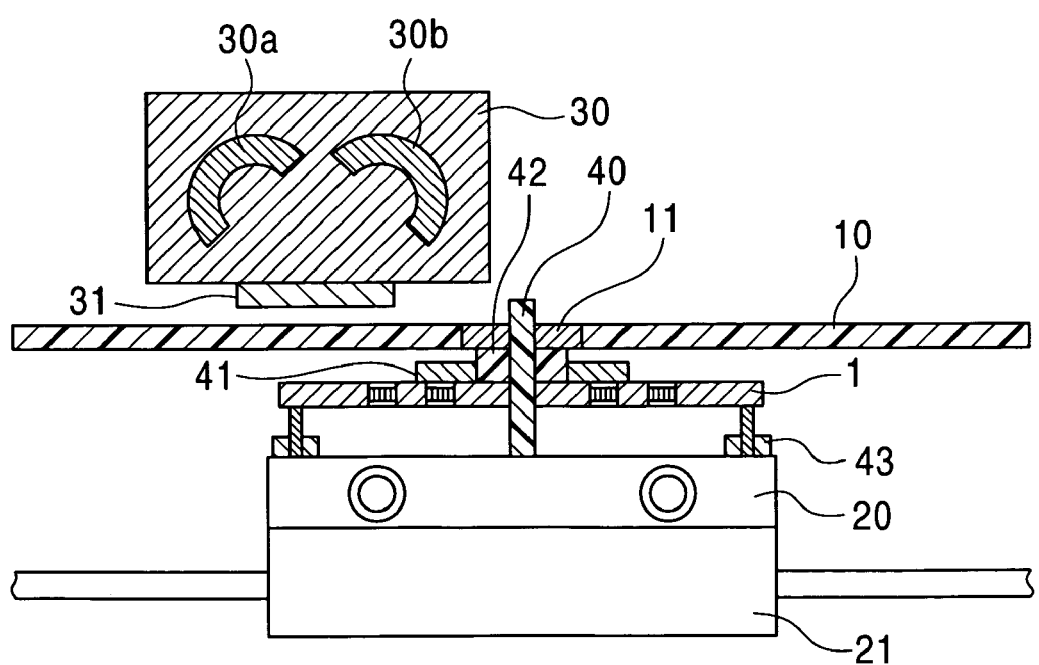
FIG. 2 is a cross-sectional view showing an operation state of the high-precision positioning apparatus according to the embodiment.

Embodiments of the present invention will now be described in detail with reference to the drawings. FIG. 1 is a cross-sectional view showing a pre-operation state of a high-precision positioning apparatus according to an embodiment. FIG. 2 is a cross-sectional view showing an operation state of the high-precision positioning apparatus according to the embodiment. In the state illustrated in FIG. 1, a coarse driving unit including a first slider 20 and a second slider 21 performs horizontal and coarse positioning of a flat recording medium 10, on a page-by-page basis, relative to an optical unit 30 including an object beam system 30a and a reference beam system 30b. In the state illustrated in FIG. 2, a fine driving unit 1 produces horizontal and small movements of the recording medium 10 for precise positioning.

Since information is recorded and played back as two-dimensional digital data on the recording medium 10, it is recorded and played back on a page-by-page basis on the recording medium 10. That is, on the recording medium 10, many pages are recorded in an arranged manner. Therefore, to record and play back information, the recording medium 10 needs to be moved horizontally and on a page-by-page basis, for positioning relative to the optical unit 30. This page-by-page movement is performed by the first slider 20 and the second slider 21 that are connected to the recording medium 10 via a driving shaft 40. The first slider 20 and the second slider 21 are slidable in respective directions orthogonal to each other and drive the recording medium 10 horizontally.

The recording medium 10 has a hole at the center for allowing the driving shaft 40 to pass through. The driving shaft 40 has a disc-shaped fixing plate 41, and is in contact with a magnetized portion 11 made of a magnet and positioned adjacent to the hole of the recording medium 10. The driving shaft 40 and the magnetized portion 11 are secured to each other by magnetic force. In this state, the recording medium 10 is not connected to the fine driving unit 1 for small movements. In the state shown in FIG. 1, the recording medium 10 is connected to the first slider 20 and the second slider 21, and thus can be moved horizontally. At this point, a certain level of positioning (with an accuracy of about 10 μm) is made on a page-by-page basis.

The first slider 20 is provided with a raising/lowering device 43 for raising and lowering the fine driving unit 1. As shown in FIG. 2, when the raising/lowering device 43 raises the fine driving unit 1, a lifting plate 42 disposed on the fine driving unit 1 penetrates an inner portion 41a of the fixing plate 41 to come into contact with the magnetized portion 11 of the recording medium 10. The magnetized portion 11 is secured to the lifting plate 42 by magnetic force. Since the thickness of the lifting plate 42 is larger than that of the fixing plate 41, further raising of the fine driving unit 1 allows the recording medium 10 to be isolated from the fixing plate 41 and to approach the optical unit 30.

Thus, the movement of the raising/lowering device 43 allows the fine driving unit 1 to be secured to the recording medium 10, isolates the recording medium 10 from the driving shaft 40, so that small movements of the recording medium 10 are performed by the fine driving-unit 1. Since page-by-page movements of the recording medium 10 have been completed in advance by the first slider 20 and the second slider 21, the fine driving unit 1 performs precise positioning (with an accuracy of 1 μm or less) of the recording medium 10 relative to the optical unit 30. That is, the coarse driving unit including the first slider 20 and the second slider 21 is used for coarse positioning, while the fine driving unit 1 is used for precise positioning; thus these units play their respective roles.

Figure 3:
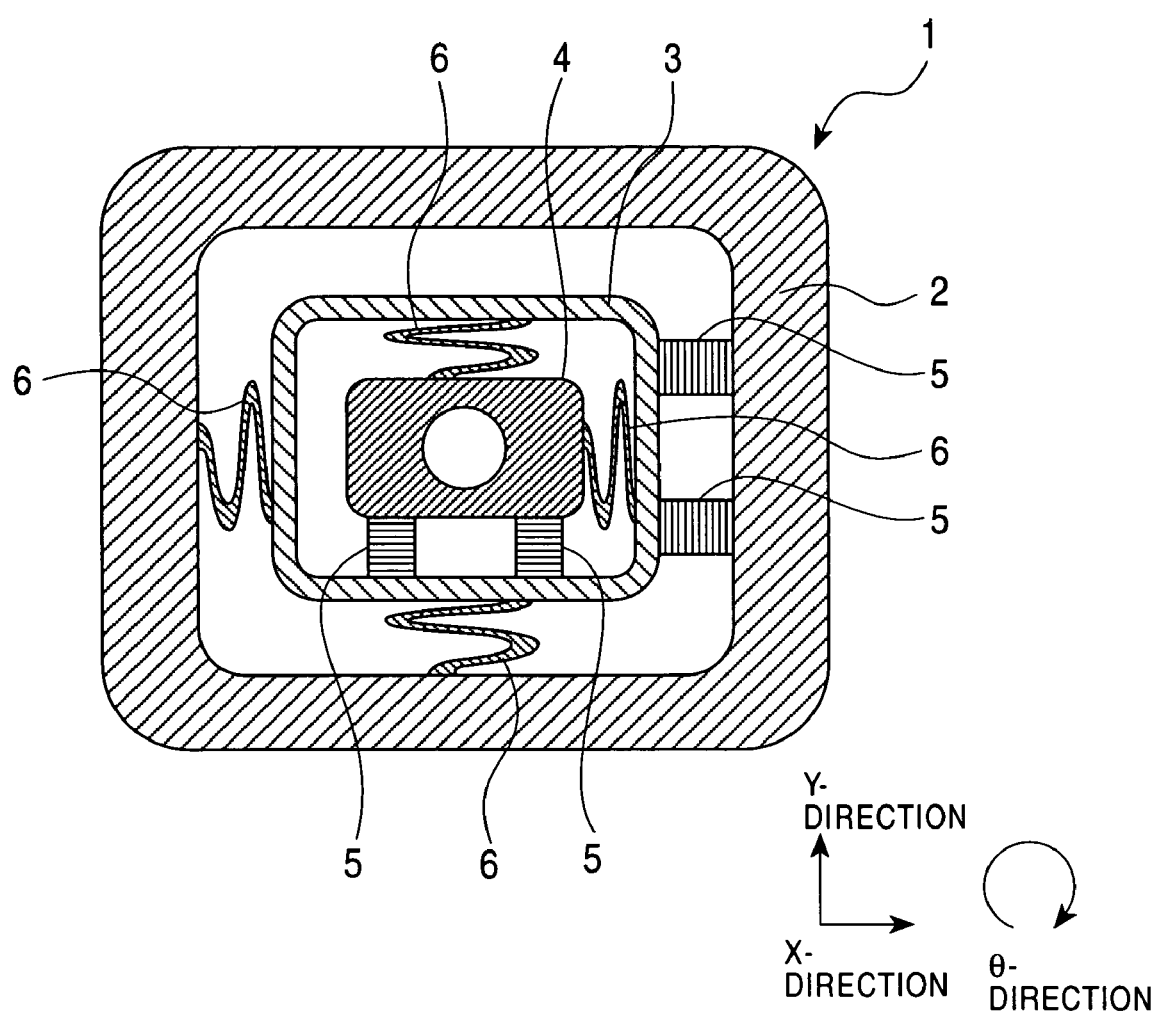
FIG. 3 is a plan view showing the high-precision positioning apparatus of the embodiment.

The fine driving unit 1 will now be described. FIG. 3 is a plan view of the fine driving unit 1. Hereinafter, X-direction, Y-direction, and θ-direction refer to those indicated in FIG. 3. The fine driving unit 1 is substantially flat and includes a substantially square and frame-shaped unit body 2, a substantially square first driving frame 3 inside the unit body 2, and a substantially square second driving frame 4 inside the first driving frame 3. The unit body 2, the first driving frame 3, and the second driving frame 4 that are included in the fine driving unit 1 are made of etched silicon. Alternatively, they may be made by microfabrication of other materials.

The first driving frame 3 is movable relative to the unit body 2 in the X-direction and θ-direction, by two fine driving devices 5 and 5 that are capable of extending and contracting linearly in the X-direction. Moreover, the first driving frame 3 is provided with elastic bodies 6 and 6, which serves as resistance to the movements of the fine driving devices 5 and 5, in the X-direction and Y-direction. The fine driving devices 5 are, for example, piezoelectric devices and are extended and contracted by application of electric fields. The elastic bodies 6 are leaf springs, extend from the first driving frame 3 to the unit body 2, and stabilize the movements of the first driving frame 3. The elastic bodies 6 are not limited to leaf springs but may be of other types of springs and rubbers.

Since the two fine driving devices 5 and 5 are arranged so as to extend and contract in the X-direction, the first driving frame 3 can be moved linearly in the X-direction relative to the unit body 2 by allowing both the fine driving devices 5 and 5 to simultaneously extend and contract by the same distance. Moreover, the first driving frame 3 can be rotated in the θ-direction relative to the unit body 2 by varying the extension/contraction distances of the two fine driving devices 5 and 5.

The second driving frame 4 is movable relative to the first driving frame 3 in the Y-direction and θ-direction, by other two fine driving devices 5 and 5 that are capable of extending and contracting linearly in the Y-direction. Moreover, the second driving frame 4 is provided with elastic bodies 6 and 6, which serves as resistance to the movements of the fine driving devices 5 and 5, in the X-direction and Y-direction.

Since the two fine driving devices 5 and 5 are arranged so as to extend and contract in the Y-direction, the second driving frame 4 can be moved linearly in the Y-direction relative to the first driving frame 3 by allowing both the fine driving devices 5 and 5 to simultaneously extend and contract by the same distance. That is, the fine driving devices 5 and 5 of the second driving frame 4 are arranged such that the second driving frame 4 is moved substantially orthogonal to the movements of the fine driving devices 5 and 5 of the first driving frame 3. Moreover, the second driving frame 4 can be rotated in the θ-direction relative to the first driving frame 3 by varying the extension/contraction distances of the two fine driving devices 5 and 5. The elastic bodies 6 extend from the second driving frame 4 to the first driving frame 3 and stabilize the movements of the second driving frame 4, similarly to those provided between the unit body 2 and the first driving frame 3.

The second driving frame 4 is provided with the lifting plate 42, which is secured to the magnetized portion 11 of the recording medium 10. The second driving frame 4 is movable relative to the first driving frame 3 in the Y-direction and θ-direction, while the first driving frame 3 is movable relative to the unit body 2 in the X-direction and θ-direction. Therefore, the second driving frame 4 is movable relative to the unit body 2 in the X-direction, Y-direction, and θ-direction. That is, the recording medium 10 secured to the second driving frame 4 is movable relative to the unit body 2 and the optical unit 30 in the X-direction, Y-direction, and θ-direction. The optical unit 30 including the object beam system 30a and the reference beam system 30b is provided with an optical reference block 31 on the undersurface. The optical reference block 31 has a flat undersurface that serves as a reference for positioning of the recording medium 10 relative to the optical unit 30.

The recording medium 10 of the present embodiment is card-shaped and is made of photorefractive material or photopolymer material. A hologram is formed on a flat surface of the recording medium 10 by the object beam system 30a and the reference beam system 30b of the optical unit 30, thereby allowing information to be stored. The information is played back and read out by the reference beam system 30b of the optical unit 30.

Figure 4:
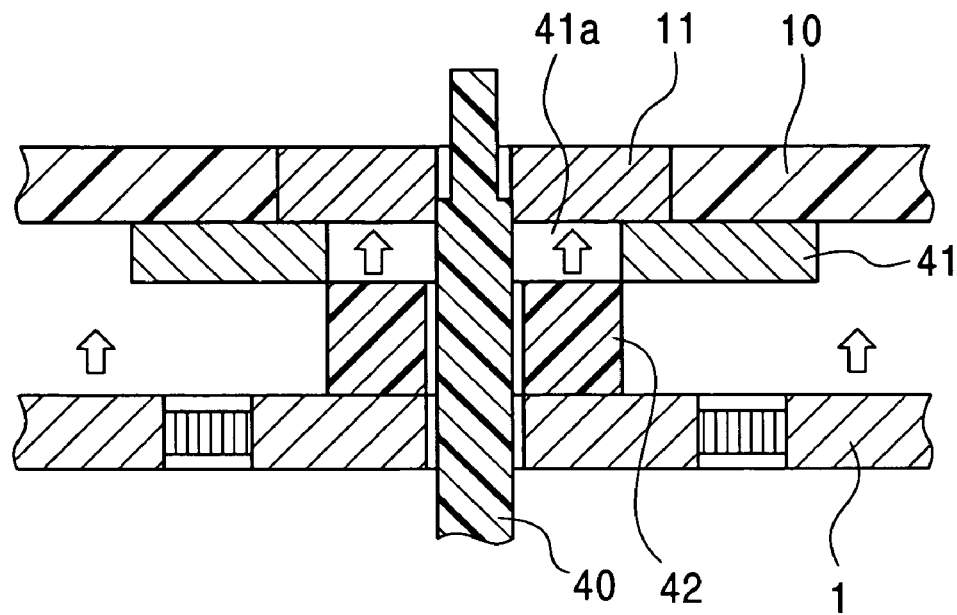
FIG. 4 is an enlarged cross-sectional view showing a pre-operation state of the high-precision positioning apparatus according to the embodiment.
Figure 5:
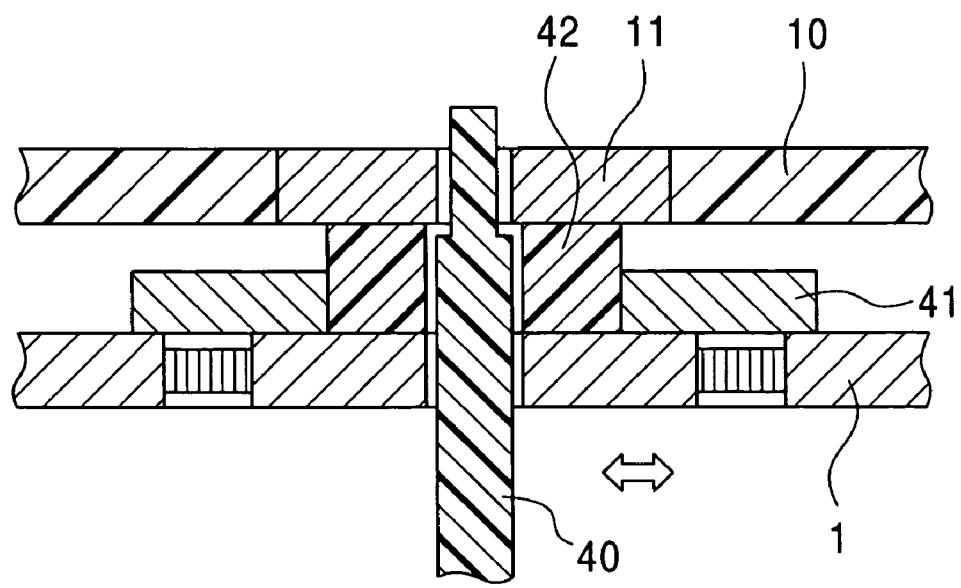
FIG. 5 is an enlarged cross-sectional view showing an operation state of the high-precision positioning apparatus according to the embodiment.

A switching operation between the coarse driving unit and the fine driving unit 1, which are provided for driving the recording medium 10, will now be described in detail. FIG. 4 is an enlarged cross-sectional view showing a state of the fine driving unit 1 before operation. FIG. 5 is an enlarged cross-sectional view showing a state of the fine driving unit 1 during operation. As shown in FIG. 4, in the state before the operation of the fine driving unit 1, the recording medium 10 is in contact with the driving shaft 40, while the magnetized portion 11 is in contact with the fixing plate 41 of the driving shaft 40 and is secured to each other. Therefore, in this state, the recording medium 10 is connected via the driving shaft 40 to the first slider 20, and is moved by the first slider 20 and the second slider 21. The fixing plate 41 is flat and doughnut-shaped with a hollow center. The lifting plate 42 on the second driving frame 4 of the fine driving unit 1 can be inserted into the inner portion 41a of the fixing plate 41.

Since the fine driving unit 1 is secured to the first slider 20 via the raising/lowering device 43, it is moved by the first slider 20 and the second slider 21 along with the recording medium 10. When the recording medium 10 is moved to a predetermined position by the first slider 20 and the second slider 21, the raising/lowering device 43 on the first slider 20 is activated to raise the fine driving unit 1, while the lifting plate 42 on the second driving frame 4 is inserted into the inner portion 41a of the fixing plate 41.

As shown in FIG. 5, the lifting plate 42, along with the upward movement of the fine driving unit 1, passes though the inner portion 41a of the fixing plate 41 to come into contact with the magnetized portion 11 of the recording medium 10 and is secured to each other. Since having a thickness larger than that of the fixing plate 41, the lifting plate 42 lifts the recording medium 10 for allowing it to be isolated from the fixing plate 41 and to approach the optical reference block 31 of the optical unit 30. The fine driving unit 1 is lifted until its upper surface comes into contact with the fixing plate 41 of the driving shaft 40. Since the upper end portion of the driving shaft 40 is narrowed via a step, the recording medium 10 lifted by the fine driving unit 1 is isolated from the driving shaft 40. In this state, since the recording medium 10, the fine driving unit 1, and the lifting plate 42 are not in contact with the driving shaft 40 and are spaced therefrom, small movements of the recording medium 10, which is secured to the fine driving unit 1, can be produced relative to the driving shaft 40 and the first slider 20.

Application of the present invention is not limited to the above-described embodiment, but may extend in various ways within the scope of the technical idea of the invention. Although the recording medium 10 of the present embodiment is in the shape of a card and performs page-by-page movements in the X-direction and Y-direction, the recording medium 10 may be in the shape of a disc such as a CD and DVD. When the recording medium 10 is in the shape of a disc, a motor instead of the second slider 21 is provided to move the recording medium 10 on a page-by-page basis. The motor and the first slider 20 rotate or linearly move the recording medium 10 for coarse positioning on a page-by-page basis relative to the optical unit 30. The fine driving unit 1 has the same structure as that of the present embodiment and performs a precise positioning of the recording medium 10 in the X-direction, Y-direction, and θ-direction.

What is claimed is:

1. A high-precision positioning apparatus comprising:
 a coarse driving unit for producing horizontal movements of a flat recording medium relative to an optical system, the recording medium being used for optically recording and playing back information, the coarse driving unit comprising
  a driving shaft, and
  a raising/lowering device; and
 a fine driving unit for producing horizontal and small movements of the recording medium relative to the optical system, the fine driving unit comprising
  a frame-shaped unit body,
  a first driving frame inside the frame-shaped unit body, and
  a second driving frame inside the first driving frame;
 wherein the driving shaft is connected to the recording medium and drives it; the raising/lowering device for producing movements of the fine driving unit along the driving shaft;
 the first driving frame is movable relative to the frame-shaped unit body by fine driving devices in the horizontal direction of the recording medium; the second driving frame is movable relative to the first driving frame by other fine driving devices in the horizontal direction of the recording medium and in the direction substantially orthogonal to the moving direction of the first driving frame;

the fine driving unit secures the second driving frame to the recording medium while being moved along the driving shaft by the raising/lowering device to isolate the recording medium from the driving shaft, and allows the first driving frame and the second driving frame to move relative to each other for producing horizontal and small movements of the recording medium.

2. The high-precision positioning apparatus according to claim 1, wherein the driving shaft has a fixing plate parallel to the recording medium and is connected to the recording medium by the fixing plate;

the fine driving unit has a lifting plate on the second driving frame, the lifting plate having a thickness larger than that of the fixing plate; and the fine driving unit moves along the driving shaft for allowing the lifting plate to come into contact with and to be secured to the recording medium, while isolating the recording medium from the fixing plate for producing small movements of the recording medium.

3. The high-precision positioning apparatus according to claim 2, wherein the recording medium includes a magnetized portion in contact with the driving shaft, the magnetized portion is fixed to the fixing plate and the lifting plate by magnetic force.

4. The high-precision positioning apparatus according to one of claims 1 to 3, wherein the fist driving frame is linearly and rotationally movable relative to the frame-shaped unit body by two fine driving devices which are separate piezoelectric motors, while the second driving frame is linearly and rotationally movable relative to the first driving frame by other two fine driving devices which are separate piezoelectric motors.

5. The high-precision positioning apparatus according to claim 4, wherein the first driving frame is connected to the frame-shaped unit body with elastic bodies, while the second driving frame is connected to the first driving frame with other elastic bodies.

* * * * *